(12) United States Patent
Averbuch et al.

(10) Patent No.: US 11,249,984 B2
(45) Date of Patent: Feb. 15, 2022

(54) SYSTEM AND METHOD FOR UPDATING MAP DATA IN A MAP DATABASE

(71) Applicant: HERE GLOBAL B.V., Eindhoven (NL)

(72) Inventors: Alex Averbuch, Buffalo Grove, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 169 days.

(21) Appl. No.: 16/419,837

(22) Filed: May 22, 2019

(65) Prior Publication Data
US 2020/0372012 A1 Nov. 26, 2020

(51) Int. Cl.
G06F 16/29 (2019.01)
G06F 16/23 (2019.01)

(52) U.S. Cl.
CPC ...... *G06F 16/2379* (2019.01); *G06F 16/2365* (2019.01); *G06F 16/29* (2019.01)

(58) Field of Classification Search
CPC .... G06F 16/29; G08G 1/09623; G08G 1/166; G08G 1/20; G08G 1/205; G08G 1/16
USPC .................... 707/E17.018, E17.055, 999.102
See application file for complete search history.

(56) References Cited

U.S. PATENT DOCUMENTS 9,459,626 B2 10/2016 Chen et al.
2009/0070031 A1* 3/2009 Ginsberg ........... G01C 21/3811
701/532
2014/0303806 A1 10/2014 Bai et al.
2016/0161265 A1* 6/2016 Bagheri ................. G01S 13/89
701/450
2019/0051153 A1 2/2019 Giurgiu et al.

FOREIGN PATENT DOCUMENTS

WO 2014072141 A1 5/2014

OTHER PUBLICATIONS

Ouyang et al., "Truth Discovery in Crowdsourced Detection of Spatial Events", Article in IEEE Transactions on Knowledge and Data Engineering 28(4):1-1, Nov. 2015, retrieved from https://eprints.soton.ac.uk/403233/1/TKDE2504928.pdf, pp. 1-14.

* cited by examiner

*Primary Examiner* — Robert W Beausoliel, Jr.
*Assistant Examiner* — Pedro J Santos
(74) *Attorney, Agent, or Firm* — Ditthavong, Steiner & Mlotkowski

(57) ABSTRACT

A method, a system, and a computer program product may be provided for updating map data in a map database to indicate presence of a road sign. The method may include obtaining first sensor data associated with a road sign. The first sensor data may comprise at least one of one or more first positive observations of a road sign or one or more first negative observations of the road sign. The method may further include obtaining second sensor data for the road sign, for example, based on the first sensor data. The second sensor data may comprise cumulative historic road sign observation data for time duration. The method may include determining a sign confidence ratio based on the first sensor data and the second sensor data. The method may include updating the map data based on the sign confidence ratio.

17 Claims, 7 Drawing Sheets

400B

| | Upper threshold | | | | | | |
|---|---|---|---|---|---|---|---|
| | 0.05 | 0.1 | 0.15 | 0.2 | 0.25 | 0.3 | 0.35 |
| 0.05 | 262 | 262 | 262 | 262 | 261 | 241 | 227 |
| 0.1 | 0 | 525 | 520 | 477 | 451 | 386 | 348 |
| 0.15 | 0 | 0 | 846 | 767 | 691 | 549 | 484 |
| 0.2 | 0 | 0 | 0 | 814 | 726 | 574 | 499 |
| 0.25 | 0 | 0 | 0 | 0 | 760 | 599 | 517 |
| 0.3 | 0 | 0 | 0 | 0 | 0 | 624 | 534 |
| 0.35 | 0 | 0 | 0 | 0 | 0 | 0 | 549 |

(Lower threshold on left axis)

| Day | Positive | Negative | Updating map data of road sign based on first sensor data | Updating map data of road sign based on first sensor data and second sensor data |
|---|---|---|---|---|
| 1 | 3 | 0 | Learned | n/a |
| 2 | 3 | 0 | Same | Learned |
| 3 | 3 | 0 | Same | Same |
| 4 | 3 | 0 | Same | Same |
| 5 | 3 | 0 | Same | Same |
| 6 | 0 | 2 | Unlearned | Same |
| 7 | 3 | 0 | Learned | Same |

FIG. 4C

| Sign ID | Sign state switches when first sensor data is used to update map data | Sign state switches when first sensor data and second sensor data is used to update map data |
|---|---|---|
| S1 | 5 | 1 |
| S2 | 5 | 2 |
| S3 | 4 | 1 |
| S4 | 3 | 2 |
| S5 | 4 | 1 |
| S6 | 4 | 1 |
| S7 | 5 | 3 |
| S8 | 3 | 3 |
| S9 | 3 | 0 |
| S10 | 2 | 2 |
| Total<sign exists> switches | 38 | 16 |

FIG. 4D

SYSTEM AND METHOD FOR UPDATING MAP DATA IN A MAP DATABASE

TECHNOLOGICAL FIELD

The present disclosure generally relates to updating map data, and more particularly relates to updating the map data which is associated with road signs in a map database.

BACKGROUND

Of late, technology has progressed towards an autonomous vehicle navigation world where accurate data plays a vital role. Navigation applications have been used extensively in highly assisted or autonomously driven vehicles and user driven vehicles. Such navigation applications rely on map databases that provide data related to geographic locations. Autonomous vehicle navigation requires a high level of data accuracy to take real-time driving decisions based on up to date data. One such piece of data may relate to presence of a road sign on a link. Data related to such road signs has been traditionally received from probe vehicles and is used to update the map database quarterly.

Map attributes often change over time. For example, new roads are constructed, some roads are closed, and speed limits change. In certain scenarios, probe vehicles are inadequate to provide a high level of accuracy in real time or near real time for the changes happening daily across different geographic locations. In certain other scenarios, the data related to road signs from customer vehicles or user vehicles may be unreliable. Challenges remain in evaluation of such data to update the map database.

Moreover, the map database may need to be updated in short time intervals or near real time and the data should have a high level of accuracy to implement accurate driving decisions in real time or near real time, for autonomous, semi-autonomous, or user driven vehicles.

BRIEF SUMMARY

Generally, the probe vehicles may be used for updating the map database using a specially owned fleet of such vehicles. However, such probe vehicles are only limited in number, and may help to provide update of data quarterly. However, such quarterly update may not be beneficial in cases which require immediate attention of the commuters. For example, when a link is undergoing some construction and/or repair activity, then to divert or warn the commuters, values of some road signs may change. For example, in the case of posted speed limit signs, posted speed values may normally be reduced in the interest of commuters and construction workers' safety. Such changes need to be brought to immediate attention of the users of vehicles, as well as to be updated in navigation systems of autonomous and semi-autonomous vehicles as much in real-time as possible. In these cases, quarterly updates to map database about road sign data, which may lead to inaccurate reporting of posted speed limits to vehicles in real-time, is undesirable.

In some scenarios, the data related to road signs from user vehicles may be unreliable. For example, the data from user cars may result in oscillation of a road sign. Oscillation of the road sign may correspond to a situation where the road sign may be learned as existing, after a short while the same road sign may be learned as not existing, and again learned as existing and vice versa. In certain scenarios, a large number of road signs may be affected because of oscillations in the road signs. In some other scenarios, small numbers of road sign observations may also affect accuracy of the data in the map database. Furthermore, such oscillations also increase the processing burden at the map database.

Thus, what may be needed are more accurate and reliable methods and systems for providing real time or near real time update of map data, such as data about the road signs.

The need for such accurate data updates may be met via ingestion of data from vehicles' sensors, coupled with its analysis, coding and distribution of relevant information derived from the sensor data and conflated with other sources, such as the data from map database. The vehicles may comprise user vehicles, reporting such data back to the map database in near real times. Since there can be a significant number of such user vehicles, thus using this data, a map database may be updated in real times or near real times.

The methods and systems disclosed herein provide for updating a map database using data from vehicles' sensor, along with data from the map database, in real time or near real times. Specifically, the methods and systems may provide for adding and removing data about a road sign, such as a posted speed sign, to the map database automatically using road sign observations from user (also hereinafter referred to as a customer) vehicles. In some embodiments, the methods and systems may provide for updating the map database to indicate presence status of a road sign, using road sign observations received in real times or near real times at the map database. The methods and systems also provide for adding and deleting data about road signs to the map database automatically using road sign observations from customer vehicles. More specifically, the methods and systems provided herein may describe computing a sign confidence ratio for the road sign. If the computed sign confidence ratio drops below an experimentally determined threshold, the road sign may be deleted from the map database. However, if the computed sign confidence ratio is greater than the experimentally determined threshold, the road sign may not be simply added to the map database. The road sign is checked for oscillation from previous state of the road sign and whether the number of road sign observations are above or below a predetermined threshold value, based on which the road sign may be added to the map database. Thus, the methods and systems may provide for automated addition or removal of road signs to the map database, such as in a digital map, based on vehicle observations.

Using the methods and the systems disclosed herein may have the advantage of providing daily map updated for the road signs. Further the methods and the systems provide highly accurate index of reality with accurate map data for implementing robust driving decisions in vehicles. The accurate map data ensures smooth organizational operations, enabling businesses to give accurate Estimated Time of Arrivals (ETAs) to customers, deliver on time, and meet stringent specifications.

A method, a system, and a computer program product are provided in accordance with an example embodiment described herein for updating map data in a map database.

Embodiments disclosed herein may provide a system (a mapping platform) for updating map data of map database. The system may include at least one non-transitory memory configured to store computer program code instructions, and at least one processor configured to execute the computer program code instructions to at least obtain first sensor data associated with a road sign. The first sensor data may comprise at least one of one or more first positive observations of a road sign or one or more first negative observations of the road sign. The system may further obtain second sensor data for the road sign, based on the first sensor data. The second sensor data may comprise cumulative historic road sign observation data for time duration. The system may further determine a sign confidence ratio based on the first sensor data and the second sensor data. The system may further update the map data based on the sign confidence ratio.

In some example embodiments, the system may update the map data to indicate absence of the road sign based on the sign confidence ratio being less than a threshold value.

In some example embodiments, the system may update the map data to indicate presence of the road sign, based on the sign confidence ratio being greater than or equal to a threshold value. Each of the one or more first positive observations may comprise time of capture of the road sign and location associated with the capture of the road sign. In accordance with an embodiment, one or more first negative observations may indicate no capture of the road sign. In some embodiments, the system may be configured to transmit a notification corresponding to the updated map data to at least one mobile device. The second sensor data may comprise at least one of one or more second positive observations or one or more second negative observations. The sign confidence ratio may be determined as: SCR= $((N_{pos}+N_{pos\ cumulative})/(N_{pos}+N_{pos\ cumulative}+N_{neg}+N_{neg\ cumulative}))$, wherein SCR indicates the sign confidence ratio, wherein $N_{Ios}$ indicates a count of the one or more first positive observations, wherein $N_{pos\ cumulative}$ indicates a count of the second positive observations, wherein $N_{neg}$ indicates a count of the first negative observations, and wherein $N_{neg\ cumulative}$ indicates a count of the second negative observations.

The method for updating map data in a map database may include obtaining first sensor data associated with a road sign, wherein the first sensor data comprises at least one of one or more first positive observations of a road sign or one or more first negative observations of the road sign. The method may include obtaining second sensor data for the road sign, wherein the second sensor data comprise cumulative historic road sign observation data for time duration. The method may further include determining, by one or more processors, a sign confidence ratio based on the first sensor data and the second sensor data. The method may further include updating the map data based on the sign confidence ratio.

Embodiments of the present invention may provide a computer program product including at least one non-transitory computer-readable storage medium having computer-executable program code instructions stored therein. The computer-executable program code instructions when executed by a computer, cause the computer to carry out operations for updating map data in a map database, the operations including obtaining first sensor data associated with a road sign, wherein the first sensor data comprises at least one of one or more first positive observations of a road sign or one or more first negative observations of the road sign, obtaining second sensor data for the road sign, based on a count of the at least one of the one or more first positive observations or the one or more first negative observations is less than a threshold value, wherein the second sensor data comprise cumulative historic road sign observation data for a time duration, determining a sign confidence ratio based on the first sensor data and the second sensor data, and updating the map data based on the sign confidence ratio.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
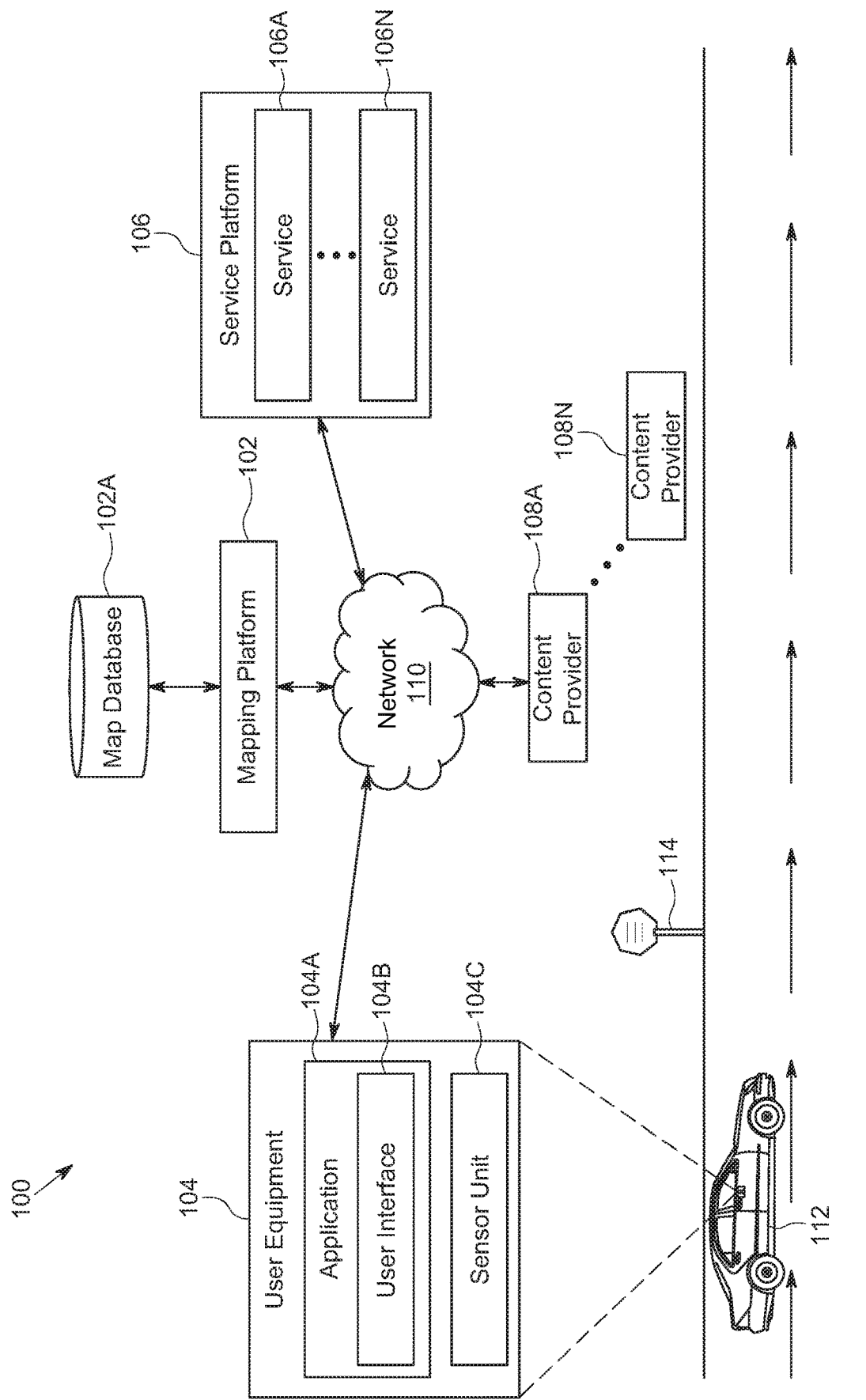
Figure 2:
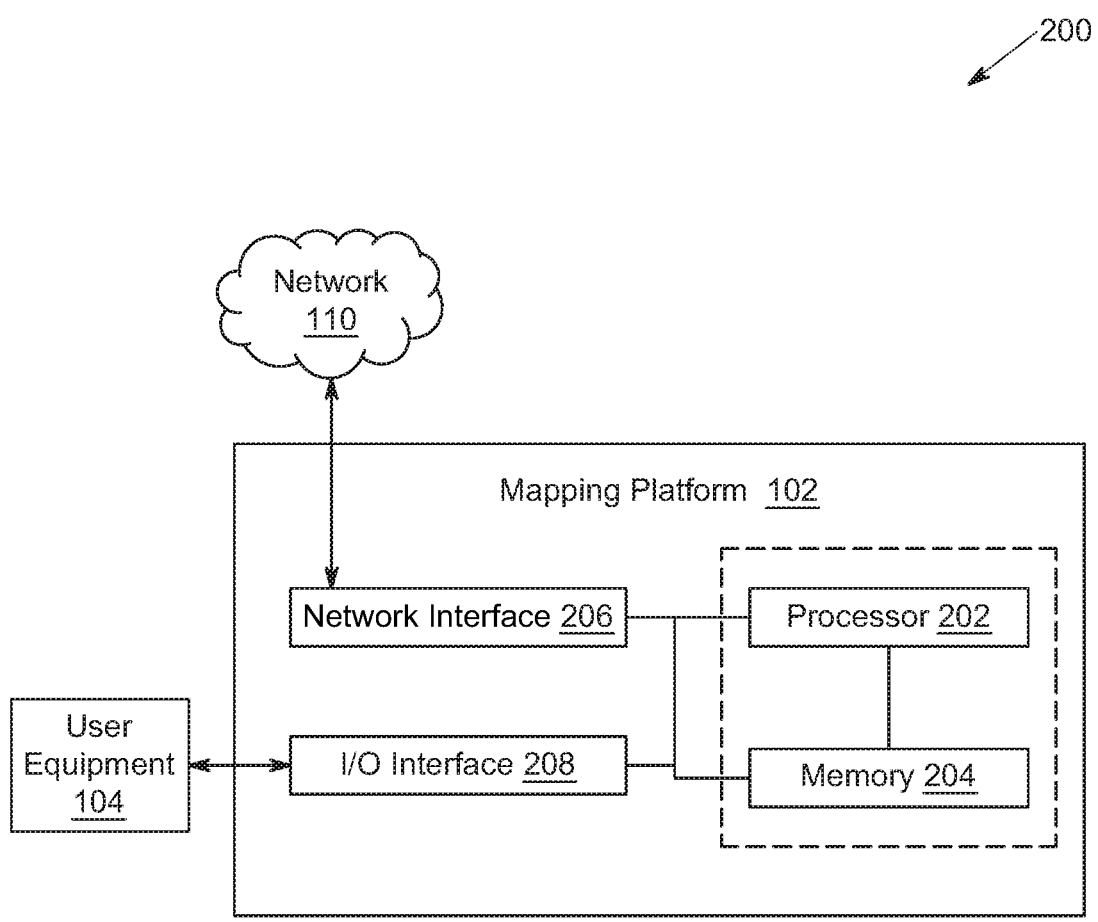
Figure 3:
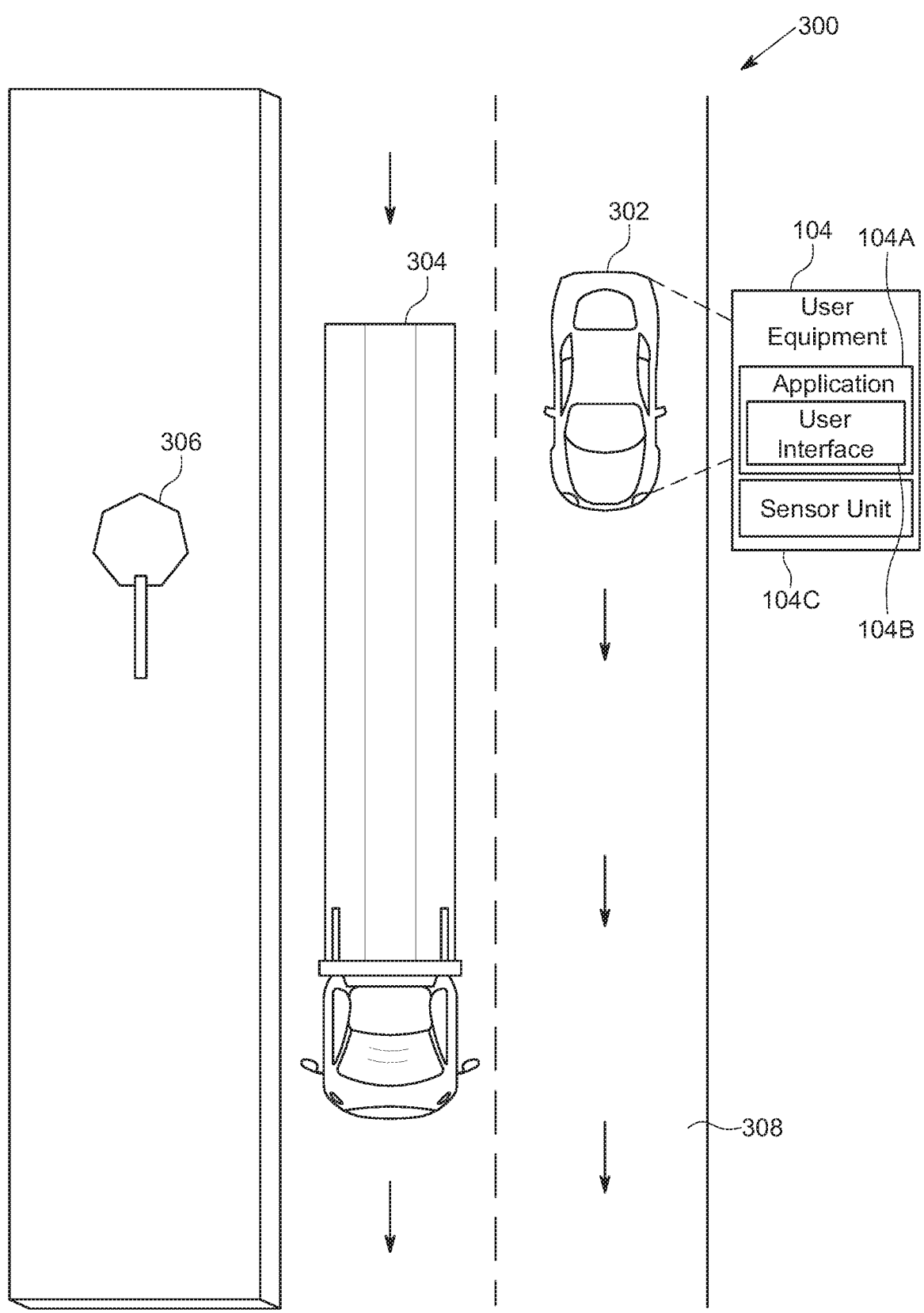
Figure 4A:
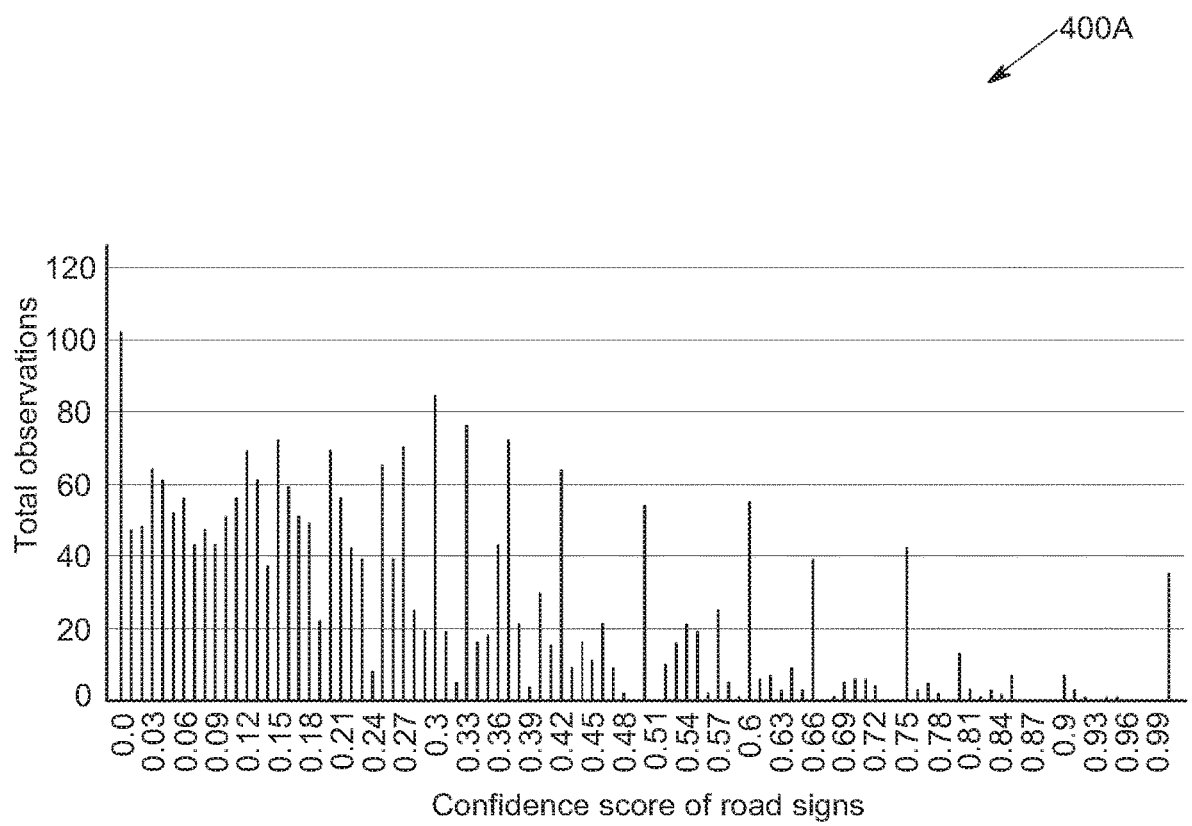
Figure 5:
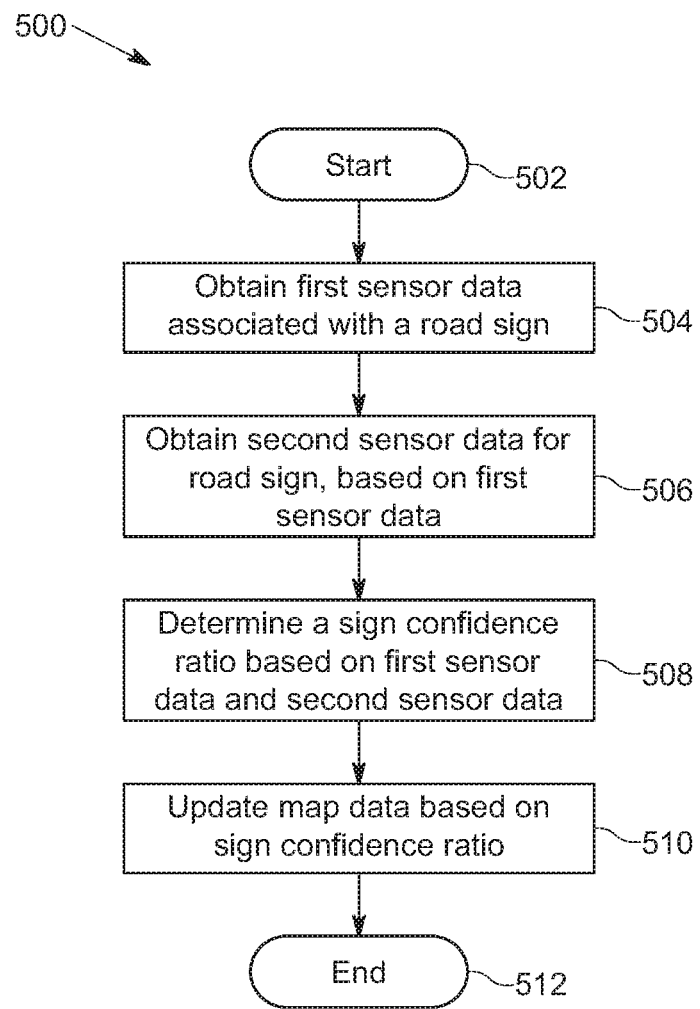

Having thus described example embodiments of the invention in general terms, reference will now be made to the accompanying drawings, which are not necessarily drawn to scale, and wherein:

FIG. 1 illustrates a block diagram of a network environment 100 of a mapping platform for updating map data associated with road signs in a map database, in accordance with an example embodiment;

FIG. 2 illustrates a block diagram 200 of the mapping platform, exemplarily illustrated in FIG. 1, that may be used to update the map data in the map database associated with the road signs, in accordance with an example embodiment;

FIG. 3 illustrates a schematic diagram 300 for an exemplary scenario for implementation of the mapping platform and method for updating the map data in the map database associated with the road signs, in accordance with an example embodiment;

FIG. 4A exemplarily illustrates a graphical representation 400A for analysis of the first sensor data for several road signs that may be fluctuating, in accordance with an example embodiment;

FIG. 4B exemplarily illustrates a tabular representation 400B of using hysteresis with various pairs of lower threshold value and upper threshold value to analyze change in state of road sign by the mapping platform 102, in accordance with an example embodiment;

FIG. 4C exemplarily illustrates tabular representation 400C to show how a road sign is updated in map data by systems and methods that determine a sign confidence ratio based on first sensor data and also show how a road sign is updated in map data by systems and methods that determine sign confidence ratio based on the first sensor data and second sensor data, when the number of road sign observations is low, in accordance with an example embodiment;

FIG. 4D exemplarily illustrates a tabular representation 400D to show road signs with multiple state switches with systems and methods to determine a sign confidence ratio based on first sensor data and also show how road signs are learned in systems and methods to determine sign confidence ratio based on the first sensor data and second sensor data when the number of road sign observations are low, in accordance with an embodiment; and FIG. 5 exemplarily illustrates a flowchart for implementation of an exemplary method 500 for updating map data in a map database to indicate presence of a road sign, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "road sign" may be used to refer to any traffic or non-traffic related sign, such as a speed limit sign, a distance indicating sign, a destination sign board, a diversion sign, a warning sign, a toll indicating sign, a lane indicating sign, a sign showing a curvature ahead, a sign showing a sharp turn, a sign showing static and/or dynamic speed limits and the like.

The term "road sign observation" may be used to refer to observation taken from a vehicle, such as a customer vehicle (user vehicle) or a probe vehicle, using one or more sensors associated with the vehicle. The observation may be related to any road sign observed by the vehicles' during a route of travel of the vehicle.

The term "route" may be used to refer to a path from a source location to a destination location on any link.

The term 'autonomous vehicle' may be used to refer to any vehicle having autonomous driving capabilities at least in some conditions. An autonomous vehicle, as used throughout this disclosure, may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

End of Definitions

A system, a method, and a computer program product are provided herein in accordance with an example embodiment for providing map updates in a map database related to road signs. The data related to road signs may indicate a presence status of the road sign. The presence status may provide information about whether a road sign is present or absent on a link, and the road sign may be added to or deleted from the map database accordingly. The update to the map database may be provided on the basis of first sensor data and second sensor data taken using vehicle sensors, and conflated with other sources. The first sensor data may comprise at least one of one or more first positive observations of a road sign or one or more first negative observations of the road sign. The second sensor data may comprise cumulative historic road sign observation data for time duration. The vehicles may comprise customer or user vehicles, which can be large in number, thus providing near real-time update of the map database with information about road signs. The system and the method disclosed herein may provide for adding and removing road signs from the map database automatically using the first sensor data and the second sensor data obtained from the vehicles or Original Equipment Manufacturer (OEM) cloud. The system and the method may determine a sign confidence ratio for a road sign based on the first sensor data and the second sensor data from customer vehicles. When the sign confidence ratio drops below a threshold value, the road sign may be deleted from the map database. However, when the sign confidence ratio supersedes the threshold value or is equal to the threshold value, the road sign may be added to the map database. Thus, using the system and the method disclosed herein, the map database may be updated with information about road signs.

FIG. 1 illustrates a block diagram of a network environment 100 of a mapping platform for updating map data in map database, in accordance with an example embodiment. There is shown a network environment 100 that may include a mapping platform 102, a map database 102, a user equipment (UE) 104, an application 104A, a user interface 104B, a sensor unit 104C, a services platform 106 with a plurality of services 106A . . . 106N, a plurality of content providers 108A . . . 108N, and a network 110. There is further shown one or more vehicles, such as a vehicle 112 on a roadway. There is also shown a road sign (such as, speed limit sign) 114 on the roadway. The UE 104 may include the application 104A, the user interface 104B, and the sensor unit 104C. The mapping platform 102 may be communicatively coupled to the UE 104, via the network 110. Also, the mapping platform 102 may be communicatively coupled to the services platform 106 and the plurality of content providers 108A . . . 108N, via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed.

The mapping platform 102 may comprise suitable logic, circuitry, interfaces, and code that may be configured to update map data associated with road signs in the map database 102A. The mapping platform 102 may be configured to determine a sign confidence ratio for road signs (such as, the road sign 114), based on sensor data collected in the map database 102A, such as obtaining first sensor data and second sensor data from customer vehicles (such as the vehicle 112). Furthermore, the mapping platform 102 may provide a threshold value for the road sign confidence ratio comparison, for the purpose of updating the map data about the road sign in the map database 102A. The update operation may include, such as, adding or deleting the road sign 114 from the map database 102A. The map database 102A may be used with the end user device, that is, the UE 104 to provide a user with navigation features and information about the road sign to be used in navigation functions. In such a case, the map database 102A may be downloaded or stored on the UE 104 which may access the mapping platform 102 through a wireless or wired connection, over the network 110.

As exemplarily illustrated, the mapping platform 102 may also include a map database 102A. In some example embodiments, the map database 102A may be communicatively coupled to the mapping platform 102. The map database 102A may store for example, but not limited to, node data, road segment data or link data, point of interest (POI) data, posted signs related data, and road sign data. The data may include node data, roadway segment data, roadway link data, point of interest (POI) data, and posted signs related data. The data may also include cartographic data, routing data, and maneuvering data. The node data may be end points corresponding to the respective links or segments of road segment data. The roadway segment data may correspond to links or segments that represent roads, streets, or paths. The roadway link data may represent a road network used by vehicles, such as, the vehicle 112. In addition, the map database 102A may include event data (e.g., traffic incidents, construction activities, scheduled events, unscheduled events, etc.) associated with the POI data records or other records of the map database 102A associated with the mapping platform 102.

The map database 102A may be configured to provide a repository of techniques for implementation of a plurality of location based services for navigation systems. For example, the mapping platform 102 may include, but not limited to, techniques related to geocoding, routing (multimodal, intermodal, and unimodal), clustering algorithms, machine learning in location based solutions, natural language processing algorithms, and artificial intelligence algorithms. The data for different modules of the mapping platform 102 may be collected using a plurality of technologies including, but not limited to drones, sensors, connected cars, cameras, probes, and chipsets. In some embodiments, the mapping platform 102 may be embodied as a chip or chip set. In other words, the mapping platform 102 may comprise one or more physical packages (such as, chips) that includes materials, components and/or wires on a structural assembly (such as, a baseboard). The map database 102A may be a master map database stored in a format that facilitates updating, maintenance, and development. For example, the master map database or data in the master map database may be in an Oracle spatial format or other spatial format, such as, for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as the UE 104. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability. The compilation to produce the end user databases may be performed by a party or entity separate from the map developer. For example, a customer of the map developer, such as a navigation device developer or other end user device developer, may perform compilation on a received map database 102A in a delivery format to produce one or more compiled navigation databases.

In some embodiments, the map database 102A may be a master geographic database configured on the side of the mapping platform 102. In accordance with an embodiment, a client-side map database may represent a compiled navigation database that may be used in or with end user devices (e.g., the UE 104) to provide navigation, speed adjustment, and/or map-related functions to navigate through roadwork zones.

Optionally, the map database 102A may contain path segment and node data records or other data that may represent pedestrian paths or areas in addition to or instead of the vehicle road record data. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, and parks. The map database 102A may include data about the POIs and their respective locations in the POI records. The map database 102A may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city).

The UE 104 may comprise suitable logic, circuitry, interfaces, and code that may be configured to provide navigation assistance to the vehicles, such as, the vehicle 112 among other services. In accordance with an embodiment, the UE 104 may be configured to provide navigation and map functions (such as, guidance and map display) for an end user (not shown in the FIG. 1). The vehicle 112 associated with the UE 104 may correspond to an autonomous vehicle or a manually driven vehicle. An autonomous vehicle, as used throughout the disclosure, may refer to a vehicle which has autonomous driving capabilities at least in some conditions. For example, the autonomous vehicle may exhibit autonomous driving on streets and roads having physical dividers between driving lanes. The UE 104 may be a part of the vehicle 112 or may be installed in the vehicle 112. In accordance with an embodiment, the UE 104 may be the vehicle itself. The UE 104 may include the application 104A with the user interface 104B, and the sensor unit 104C. In accordance with an embodiment, the UE 104 may be an in-vehicle navigation system, such as, an infotainment system, a personal navigation device (PND), a portable navigation device, a cellular telephone, a smart phone, a personal digital assistant (PDA), a watch, a camera, a computer, a workstation, and other device that may perform navigation-related functions (such as digital routing and map display). Examples of the UE 104 may include, but is not limited to, a mobile computing device (such as a laptop computer, tablet computer, mobile phone and smart phone), navigation unit, personal data assistant, watch, and camera. Additionally or alternatively, the UE 104 may be a fixed computing device, such as a personal computer, computer workstation, kiosk, office terminal computer or a system.

In accordance with an embodiment, the UE 104 may be an in-vehicle navigation system for navigation and map functions (such as, guidance and map display). The UE 104 may include the application 104A with the user interface 104B to access one or more map and navigation related functions. In other words, the UE 104 may include the application 104A (such as, a mapping application) with the user interface 104B. The user interface 104B may be configured to enable the end user associated with the UE 104 to access the mapping platform 102.

The sensor unit 104C may be configured within the UE 104. The sensor unit 104C comprising multiple sensors may capture road signs along routes in a geographic location. The sensor unit 104C may include one or more sensors to generate the road sign observations. The road sign observations may include positive road sign observations and negative road sign observations. Road sign observation data collected for a time duration may correspond to cumulative historic road sign observation data for that time duration. For example, the sensor unit 104C may include an image capture device (such as, a camera) to capture the road signs (such as, speed limit signs 114). The UE 104 may be configured to generate positive and negative sign observations based on sensor data captured by the sensors. In accordance with an embodiment, the UE 104 may be accessible to the mapping platform 102 via the network 110. In certain embodiments, the sensor unit 104C may be configured to detect road signs for determination of positioning of the vehicle 112. In accordance with an embodiment, the sensor unit 104C may be built-in, or embedded into, or within interior of the UE 104. In some embodiments, the vehicle 112 may have sensors positioned on or within the vehicle 112. The sensors of the sensor unit 104C may be configured to provide sensor data comprising location data associated with a location of the vehicle 112, heading data associated with the road signs, (such as, speed limit signs 114), sign types of the road signs, sign values of the road signs along the roadway. The sensors may generate the location data from systems that include, but not limited to, a positioning system, a Global Navigation Satellite System (such as Global Positioning System (GPS), Galileo, GLONASS and BeiDou), cellular tower location methods, access point communication fingerprinting (such as Wi-Fi or Bluetooth based radio maps). In accordance with an embodiment, the sensor unit 104C may be configured to transmit the sensor data to an Original Equipment Manufacturer (OEM) cloud. Examples of the sensors in the sensor unit 104C may include, but not limited to, a camera, an acceleration sensor, a gyroscopic sensor, a LIDAR sensor, a proximity sensor, and a motion sensor.

The services platform 106 may provide navigation related functions and services 106A . . . 106N to the application 104A running on the UE 104. The services 106A . . . 106N may include navigation functions, speed adjustment functions, traffic related updates, weather related updates, warnings and alerts, parking related services and indoor mapping services. In accordance with an embodiment, the services 106A . . . 106N may be provided by the plurality of content providers 108A . . . 108N. In some examples, the plurality of content providers 108A . . . 108N may access various Software Development Kits (SDKs) from the services platform 108 for implementation of one or more services 106A . . . 106N. In accordance with an embodiment, the services platform 108 and the mapping platform 102 may be integrated into a single platform to provide a suite of mapping and navigation related applications for OEM devices, such as the UE 104. The UE 104 may be configured to interface with the services platform 106, the plurality of content provider 108A . . . 108N, and the mapping platform 102 over the network 110. Thus, the mapping platform 102 and the services platform 106 may enable provision of cloud-based services for the UE 104, such as, storing the first sensor data and the second sensor data in the OEM cloud in batches or in real-time and retrieving the stored sensor data (such as first sensor data and second sensor data) for determining sign confidence ratio of a road sign, such as the road sign 114.

The plurality of content providers 108A . . . 108N may be configured to maintain data stored in the map database 102A. A content provider such as a map developer may maintain the mapping platform 102. By way of example, the map developer may collect geographic data to generate and enhance the mapping platform 102. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. Crowdsourcing may be based on gathering data using customer vehicles. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform the map database 102A of features within an environment that are appropriate for mapping. For example, motion sensors, inertia sensors, image capture sensors, proximity sensors, LiDAR (light detection and ranging) sensors, ultrasonic sensors etc. The gathering of large quantities of crowd-sourced data may facilitate the accurate modeling and mapping of an environment, whether it is a road segment, a road sign or the interior of a multi-level parking structure. Also, remote sensing, such as aerial or satellite photography, may be used to generate map geometries directly or through machine learning as described herein.

The network 110 may comprise suitable logic, circuitry, and interfaces that may be configured to provide a plurality of network ports and a plurality of communication channels for transmission and reception of data, such as the sensor data, map data from the map database 102A, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 110 may include a medium through which the mapping platform 102 and the UE 104 may communicate with each other. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

In operation, the vehicle 112 may navigate along at least a route (which may be simply referred as a route) of a geographical area. The vehicle 112 may navigate through the route that includes at least a road sign, such as the road sign 114. Although one vehicle 112 is depicted in FIG. 1, it may be contemplated that the mapping platform 102 may operate with multiple vehicles in tandem. As such, while one or more such vehicles, as the vehicle 112, may capture first sensor data for updating map data, one or more other vehicles may utilize the map data updated by the mapping platform 102 in the map database 102A, to provide navigation assistance and related functions.

The first sensor data may refer to sensor data collected from sensor unit 104C in the UE 104 of the vehicle 112. The first sensor data may be generated by the UE 104 based on detection of static road signs positioned along the pathways or roadways. The first sensor data may comprise at least one of one or more first positive observations of a road sign or one or more first negative observations of the road sign. In an embodiment, the first sensor data may refer to sensor data from digital or dynamic signs, such as, LED panels, LCD panels, etc., positioned along the pathways. In one example, the road signs may be static road signs or variable road signs positioned along the routes. Sign values of variable road signs may vary based on traffic conditions in the vicinity of the variable road signs. For example, the variable road signs may be displayed on LCD display panels, LED panels, etc. positioned along the road. The first sensor data may comprise time of capture of the road sign 114 from vehicles such as, the vehicle 112. The vehicles, such as, the vehicle 112 passing by location of each of the road signs (such as, the road sign 114) on the pathway, generate the first sensor data for each of the road signs. Thus, the first sensor data associated with road signs may be different, based on location data, heading data, road sign value, and road sign type, and time of capture of the road sign from a vehicle. The captured location of the road sign, type of the road sign, value of the road sign, heading at the location of the road sign, and time stamp associated with the capture of the road sign may constitute the first sensor data. Sensor data from the different sensors installed in the sensor unit 104C of the UE 104 of the vehicle 112 may be converted to units and ranges compatible with the mapping platform 102, to accurately generate the first sensor data.

In accordance with an embodiment, the sensor data from the vehicle 112 may be collected by any device capable of determining the necessary information, and providing the necessary information to a remote entity. The UE 104 is one example of a device that may function as a probe to collect the first sensor data.

The mapping platform 102 may be configured to obtain the data, for example, the first sensor data, from at least one vehicle 112 or the OEM cloud. Further, the mapping platform 102 may be configured to obtain second sensor data, from at least one vehicle 112 or the OEM cloud. The second sensor data may comprise cumulative historic road sign observation data for a time duration. The mapping platform 102 may store the first sensor data and the second sensor data in the map database 102A. In an embodiment, the first sensor data and the second sensor data may be stored in the OEM cloud and the mapping platform 102 may obtain the first sensor data and the second sensor data from the OEM cloud. In accordance with an embodiment, the sensor data captured by the sensor unit 104C of the UE 104 in the vehicle 112 may be curated into the first sensor data and the second sensor data and transmitted to the OEM cloud sequentially. In accordance with an embodiment, the mapping platform 102 may schedule the first sensor data and the second sensor data for transmission to the OEM cloud in batches. In such scenarios, the mapping platform 102 may retrieve the first sensor data and the second sensor data from the OEM cloud.

In some example embodiments, the first sensor data may be collected from a plurality of vehicles over a predetermined duration of time, such as 24 hours or 48 hours or any other such duration. Similarly, the second sensor data may be collected from a plurality of vehicles over a predetermined duration of time, such as 48 hours or any other such duration. The first sensor data and the second sensor data may be obtained by the mapping platform 102 which may be in communication with the UE 104 associated with the vehicle 112.

The mapping platform 102 may be configured to transform, process, and execute upon the first sensor data and the second sensor data to identify different types of observations. The first sensor data may comprise at least one of one or more first positive observations of the road sign 114 or one or more first negative observations of the road sign 114. In accordance with an embodiment, each of the one or more first positive observations may comprise time of capture of the road sign 114 and location associated with the capture of the road sign 114. For example, the first sensor data comprising an explicit report from the vehicle that the vehicle observed a road sign 114 at a location with coordinates (x, y, z) and time (t), may comprise the one or more first positive observations of the road sign 114.

In accordance with an embodiment, the one or more first negative observations may indicate no capture of the road sign 114. Thus, the one or more first negative observations may comprise a report from the vehicle 112 stating that the vehicle 112 expected to see a road sign 114 at the given location, but the road sign 114 was not observed. That is to say, the vehicle 112 may not provide explicit one or more first negative observations. However, the one or more first negative observations may be inferred from vehicle traces. The mapping platform 102 may identify the one or more first positive observations and the one or more first negative observations of the road sign 114.

In some example embodiments, the mapping platform 102 may be configured to perform the inference of vehicle traces to identify whether a road sign observation is a first negative observation. The inference may be done by analyzing that whether the vehicle 112 passes by the road sign 114 according to their GPS path, and the vehicle 112 did not report the road sign to the mapping platform 102, then that may be considered as the first negative observation.

In some example embodiments, the second sensor data received within a predefined duration of time may be considered for determining the sign confidence ratio. In some example embodiments, the second sensor data may be obtained when the count of observations in the first sensor data is less than a threshold value. That is on a day on which the sign is learned, the count of the observations in the first sensor data may be considered for obtaining the second sensor data. The second sensor data may comprise cumulative historic road sign observation data for time duration (such as 48 hours, 72 hours or any other duration). The time duration may be set as the most optimum time duration based on experimental analysis. For example, the second sensor data received within the last 48 hours or received within the last 72 hours may be considered based on experimental validation of results of considering each of these cases, to determine which duration gives more accuracy in reporting the presence of the road sign more accurately. The second sensor data may comprise at least one of one or more second positive observations or one or more second negative observations.

In accordance with some embodiments, there may be a small number of such observations which are received from the customer vehicle, such as the vehicle 112 on a road, such as a road located in a rural area. The dependence of the sign confidence ratio on the one of one or more second positive observations or the one or more second negative observations of the second sensor data may help in increasing the accuracy of reporting the road sign 114 correctly by the mapping platform 102 when a number of observations from the first sensor data (the one or more first positive observations or the one or more first negative observations) are less than a predefined number of observations. The predefined number of observations may be determined based on experimental analysis of ground truth data or may be defined considering the location/geographic region in which the sign is posted.

Further, there may be an oscillation of a road sign while the mapping platform 102 updates the map data in the map database 102A based on the first sensor data. The oscillation may correspond to a road sign being learned as existing, after a short while the same sign may be learned as not existing, and after a while, again learned as existing.

Thus, the second sensor data that includes cumulative historic road sign observation data for a time duration may be specifically advantageous in increasing the accuracy of the method and the system disclosed herein in view of the prior art methods and systems which mostly rely only on the one or more first positive observations and the one or more second positive observations. The one or more second positive observations or the one or more second negative observations of the second sensor data may be used further to determine the sign confidence ratio for an observed road sign (such as the road sign 114). Therefore, impact of small number of observations that causes switch or oscillation in a state of a road sign may be resolved when the cumulative historic data of the second sensor data may be used with the first sensor data to determine the sign confidence ratio for making an accurate decision about learning or unlearning of the road sign.

In accordance with an embodiment, the mapping platform 102 may be configured to determine the sign confidence ratio based on the first sensor data and the second sensor data. the sign confidence ratio may be stated mathematically as:

$$SCR = ((N_{pos} + N_{pos\ cumulative})/(N_{pos} + N_{pos\ cumulative} + N_{neg} + N_{neg\ cumulative})),$$

wherein SCR indicates the sign confidence ratio, wherein $N_{pos}$ indicates a count of the one or more first positive observations, wherein $N_{pos\ cumulative}$ indicates a count of the one or more second positive observations, wherein $N_{neg}$ indicates a count of the one or more first negative observations, and wherein $N_{neg\ cumulative}$ indicates a count of the one or more second negative observations.

The mapping platform 102 may be configured to update the map data based on the sign confidence ratio. In accordance with an embodiment, the mapping platform 102 may be configured to update the map data to indicate absence of the road sign 114 based on the sign confidence ratio being less than a threshold value. In accordance with an embodiment, the mapping platform 102 may be configured to update the map data to indicate presence of the road sign, based on the sign confidence ratio being greater than or equal to a threshold value. The mapping platform 102 may be configured to transmit a notification corresponding to the updated map data to at least one user device, such as a mobile device. In accordance with an embodiment, the mapping platform 102 may be configured to provide navigation suggestions to the user of the vehicle 112 to slow down in case of a reduced speed limit sign observed at a construction location.

FIG. 2 illustrates a block diagram 200 of the mapping platform, exemplarily illustrated in FIG. 1, which may be used to update the map data in the map database associated with the road signs, in accordance with an example embodiment. FIG. 2 is described in conjunction with elements from FIG. 1. The mapping platform 102 may include one or more processors, such as a processor 202, a memory 204, a network interface 206, and an input/output (I/O) interface 208. The mapping platform 102 may connect to the UE 104 via the I/O interface 208. The processor 202 may be communicatively coupled to the network interface 206, the I/O interface 208, and the memory 204.

The processor 202 may comprise suitable logic, circuitry, and interfaces that may be configured to execute instructions stored in the memory 204. The processor 202 may be configured to update the map data associated with road signs (such as the road sign 114) in the map database 102A. In some example embodiments, the processor 202 may obtain first sensor data captured by the plurality of vehicles, such as, the vehicle 112 to determine sign confidence ratio. In some example embodiments, the processor 202 may obtain second sensor data that may be cumulative historic road sign observation data for time duration, captured by the plurality of vehicles, such as, the vehicle 112 to determine a sign confidence ratio. The first sensor data and the second sensor data may be associated with corresponding time stamps, corresponding locations, corresponding headings, and corresponding sign values. The processor 202 may be configured to update map data to add or delete the road sign 114 from the map database 102A.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some embodiments, the processor 202 may include one or more processing cores configured to perform independently. A multi-core processor may enable multiprocessing within a single physical package.

Additionally or alternatively, the processor 202 may include one or more processors configured in tandem via the bus to enable independent execution of instructions, pipelining and/or multithreading. Additionally or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an embodiment of the disclosure by further configuration of the processor 202 by instructions for performing the algorithms and/or operations described herein.

In some embodiments, the processor 202 may be configured to provide Internet-of-Things (IoT) related capabilities to users of the UE 104 disclosed herein. The IoT related capabilities may in turn be used to provide smart city solutions by providing real time parking updates, big data analysis, and sensor based data collection for providing navigation and parking recommendation services. In some embodiments, the mapping platform 102 may be configured to provide an environment for development of parking strategy recommendation solutions for navigation systems in accordance with the embodiments disclosed herein. The environment may be accessed using the I/O interface 208 of the mapping platform 102 disclosed herein.

The memory 204 may comprise suitable logic, circuitry, and interfaces that may be configured to store a machine code and/or instructions executable by the processor 202. The memory 204 may be configured to store information including processor instructions for updating the map data in the map database 102A. The memory 204 may be used by the processor 202 to store temporary values during execution of processor instructions. The memory 204 may be configured to store the first sensor data and the second sensor data from the UE 104 and the map data from the map database 102A. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the mapping platform 102 and other systems and devices in the network environment 100, via the network 110. The network interface 206 may communicate with the services platform 106 and the plurality of content provider 108A . . . 108N, via the network 110 under the control of the processor 202. In one embodiment, the network interface 206 may be configured to communicate with the sensor unit 104C disclosed in the detailed description of FIG. 1 and may receive the first sensor data and the second sensor data corresponding to the road sign 114. In an alternative embodiment, the network interface 206 may be configured to receive the first sensor data and the second sensor data from the OEM cloud over the network 110 as described in FIG. 1. In some example embodiments, the network interface 206 may be configured to receive destination information of a vehicle, such as the vehicle 112, via the network 110. In accordance with an embodiment, a controller of the UE 104 may receive the first sensor data and the second sensor data from a positioning system of the UE 104. The network interface 206 may be implemented by use of known technologies to support wired or wireless communication of the mapping platform 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between a user (e.g., a driver) of the UE 104 and different operational components of the mapping platform 102 or other devices in the network environment 100. The I/O interface 208 may facilitate an I/O device (for example, an I/O console) to receive an input (e.g., the first sensor data and the second sensor data from the sensor unit 104C of the UE 104) and present an output to the UE 104 based on the received input. The I/O interface 208 may include various input and output ports to connect various I/O devices that may communicate with different operational components of the mapping platform 102. The I/O interface 208 may be configured to output the updated map data to a user device such as the UE 104 of FIG. 1. In example embodiments, the I/O interface 208 may be configured to provide the map data to the map database 102A to update the map of associated roadway. Thus, a user requesting a route through such a road may be updated about the presence of the road sign 114, for example to slow down speed of the vehicle 112. In an embodiment, the mapping platform 102 may be configured to assist in providing navigational suggestions to the user of the vehicle 112. Examples of the input devices may include, but is not limited to, a touch screen, a keyboard, a mouse, a joystick, a microphone, and an image-capture device. Examples of the output devices may include, but is not limited to, a display, a speaker, a haptic output device, or other sensory output devices.

FIG. 3 illustrates a schematic diagram 300 for an exemplary scenario for implementation of the mapping platform and method for updating the map data in the map database associated with the road signs, in accordance with an embodiment of the disclosure. FIG. 3 is described in conjunction with elements from FIG. 1 and FIG. 2. There is shown a car 302, a truck 304, and a road sign 306 on a roadway 308. The car 302 may include the UE 104 which is installed inside a car 302. The UE 104 may include the application 104A, the user interface 104B, and the sensor unit 104C. The vehicle 302 may be coupled to the mapping platform 102 and other components in the network environment 100 via the network 110.

In operation, the car 302 may navigate along at least a route (which may be simply referred as a route) on the roadway 308. The car 302 may navigate through the route on the roadway 308 that includes at least a road sign, such as the road sign 306.

The car 302 associated with the UE 104 may correspond to an autonomous vehicle or a manually driven vehicle. The UE 104 may be a part of the car 302. The UE 104 may be installed in the car 302.

As such, while one or more such vehicles may capture the road sign 306 to generate sensor data for updating map data, one or more other vehicles may utilize the map data updated by the mapping platform 102 in the map database 102A, to provide navigation assistance and related functions.

The sensor data (such as the first sensor data) from the vehicles may be collected by any device capable of determining the necessary information, and providing the necessary information to a remote entity. The mapping platform 102 may be configured to transform, process, and execute upon the sensor data to determine sign confidence ratio of a road sign. However, in certain scenarios, the road signs (such as the road sign 306) may be added on one day and the same road sign may be deleted on next day. The addition and deletion of the road signs in the map data of the map database based on first sensor data may cause fluctuation in the status of the road sign that whether the road sign is present or absent on the location. The fluctuation in the status of the road sign may be caused by a low number of observations from the first sensor data at particular time duration.

In accordance with an embodiment, a vehicle (not shown in the FIG. 3) may have passed by the road sign 306 and would have captured the road sign 306 based on which the road sign 306 may be added to the map data of the map database. When a vehicle recognizes the road sign 306, it is considered as a positive observation of a posted sign. The positive observation of the posted road sign 306 may be considered to be an explicit report from the vehicle that it observed the posted road sign 306 at location x, y, z and at time t Further, the truck 304 and the car 302 passes by the road sign 306 on the same day. The truck 304 may obstruct the view of the car 302 and consequently the car 302 may not be able to capture the road sign 306. Various other reasons may be possible due to which the car 302 may not be able to capture the road sign 306. For example, the car 302 may not be able to capture the road sign 306 due to blockage of the field of view of the imaging sensor of the car 302. The blockage may be due to another vehicle parked alongside the road sign 306, or branches of a tree may extend ahead of the road sign 306 due to which it may not be captured from the car 302. In some scenarios, owing to the precision of the imaging sensor of the car 302, it may not be able to capture the road sign 306 at night time or during poor visibility conditions (such as on a foggy day, rainy day, and the like). When a vehicle does not recognize the road sign, it is considered as a negative observation of a posted sign. The negative observation of the posted speed sign may be considered to be a report from the vehicle stating that it expected to see a road sign, but the road sign is not captured. In accordance with an embodiment, OEM vehicles may not provide explicit negative observations. However, negative observations may be inferred implicitly from vehicle traces. Such that, when a vehicle passes by a sign according to their GPS path and the vehicle did not report the sign to the cloud, then it may be considered as one negative observation. Based on the negative observation, the road sign 306 may be deleted from the map data of the map database.

A considerable amount of fluctuation (or oscillation) may be observed in the status of the road signs especially when the number of road sign observations is very small. In an example embodiment, the low number of road sign observations may range from 1 to 3. A road sign may be learned from a large number of road sign observations as the accuracy of detection of the road sign may be high in such cases. However, on some roads (such as an agricultural road), the density of the vehicles may be very low (as compared to city roads where the density of vehicles is very large). Consequently, the number of road sign observations associated with the road sign on such roads may be low which may cause jittering of the road sign by adding or deleting the road sign on regular intervals (such as, every day). In such cases, the second sensor data received within a predefined duration of time may be considered for determining the sign confidence ratio. The second sensor data may comprise cumulative historic road sign observation data for time duration (such as 48 hours, 72 hours, or any other such duration). The time duration may be defined with respect to the date on/for which the first sensor data is captured. The time duration may be configurable and set as the most optimum time duration based on experimental analysis. For example, the second sensor data received within the last 48 hours or received within the last 72 hours may be considered based on experimental validation of results of considering each of these cases, to determine which duration gives more accuracy in reporting the presence of the road sign more accurately. The second sensor data may comprise at least one of one or more second positive observations or one or more second negative observations.

The dependence of the sign confidence ratio on the one of one or more second positive observations or the one or more second negative observations of the second sensor data may help in increasing the accuracy of reporting the road sign 306 correctly by the mapping platform 102 when a number of observations from the first sensor data (the one or more first positive observations or the one or more first negative observations) are less than a predefined number of observations. The predefined number of observations may be configurable based on experimental analysis of ground truth data.

Thus, the second sensor data that includes cumulative historic road sign observation data for a time duration may be specifically advantageous in increasing the accuracy of the method and the system disclosed herein in view of the prior art methods and systems which mostly rely only on the one or more first positive observations and the one or more second positive observations. The one or more second positive observations or the one or more second negative observations of the second sensor data may be further used to determine the sign confidence ratio for an observed road sign (such as the road sign 306). Therefore, impact of small number of observations that causes switch or oscillation in a state of a road sign may be resolved when the cumulative historic data of the second sensor data may be used with the first sensor data to determine the sign confidence ratio for making an accurate decision about learning or unlearning of the road sign.

The mapping platform 102 may be configured to update the map data based on the sign confidence ratio. The mapping platform 102 may be configured to update the map data to indicate presence of the road sign, based on the sign confidence ratio being greater than or equal to a threshold value. The mapping platform 102 may be configured to transmit a notification corresponding to the updated map data to at least one user device, such as a mobile device.

FIG. 4A exemplarily illustrates a graphical representation 400A for analysis of the first sensor data for several road signs that may be fluctuating, in accordance with an example embodiment. X-axis represents confidence scores (also referred as sign confidence ratio) of the road signs. The confidence score of each road sign may range between 0 and 1. Y-axis represents a total number of observations.

The graphical representation 400A shows a histogram of confidence distribution of the road signs to demonstrate fluctuation of the road signs based on values of the sign confidence ratio determined by the mapping platform 102.

The mapping platform may provide for determining the sign confidence ratio for a road sign using the first sensor data from customer vehicles. When the sign confidence ratio drops below a threshold value, the road sign is deleted from the map database. However, when the sign confidence ratio supersedes the threshold value, the road sign is added to the map database. Thus, the map data of the map database may be updated nearly daily with information about road signs. In accordance with an embodiment, the threshold value for the sign confidence ratio may be 0.15 which has been run on the test data of the hundred road signs. Total number of the road sign state changes has been counted. In the FIG. 4A, as illustrated, a lot of data is present around the threshold value of 0.15, thus creating perfect conditions for the fluctuations in the state of road signs. The road signs closer to a lower end of spectrum on the x-axis are fluctuating more than the road signs on the higher end of the spectrum. Therefore, the graphical representation shows that the problem is the lower end of the spectrum on the x-axis and the sign confidence ratio of the road signs is also low which acts as a gray area that whether the road sign is present or absent. Although, the threshold for the sign confidence ratio has been described as a fixed value, in some example embodiments a threshold range may be considered for validating the sign confidence ratio.

The accuracy of the determination of the road sign presence may also depend upon choosing an optimal threshold value for sign confidence ratio comparison. The optimal threshold value determination may further be explained in conjunction with FIG. 4B FIG. 4B exemplarily illustrates a tabular representation 400B of using hysteresis with various pairs of lower threshold value and upper threshold value to analyze change in state of road sign by the mapping platform 102, in accordance with an example embodiment. The tabular representation 400B shows the number of changes in the state of road sign for different values of upper threshold values and lower threshold values.

For more accurate analysis to road sign presence, another factor needs to be considered for setting the threshold value for the sign confidence ratio comparison. Hysteresis may be defined as the adjustment in the threshold value to avoid jitter in the system. The jitter in the system of map database update may cause incorrect addition or removal of a road sign to the map database due to noise. For example, if on a day 'n' the sign confidence ratio computed is 0.16 the road sign would be added to the map and if on day 'n+1' the confidence is 0.14, the sign would be deleted. However, this change in confidence could be due to noise. Thus, to prevent such jitter, hysteresis may be considered where two threshold values, that is, upper threshold value and lower threshold value may be used.

For example, when no hysteresis is chosen, the number of sign state changes in road sign is considered to be 852. When an upper threshold value of 0.2 and a lower threshold value of 0.15 may be considered, the number of state changes in the road sign is 767. This reduction in the number of state changes in road sign may not be significant as compared to 852. Further, when an upper threshold value of 0.3 and a lower threshold value of 0.1 may be considered, the number of state changes in the road sign is 386. This reduction in the number of state changes in road sign may be significantly reasonable as compared to 852. In this example, when the sign confidence ratio surpasses the upper threshold value of 0.3, then the road sign is added to the map database. Similarly, when the confidence falls below 0.1, then the road sign is removed from the map database. This strategy controls jitter that is due to random noise in the vehicle observations. Noise from vehicle observations exist, for example, when a vehicle did not observe a road sign due its line of sight been obstructed due to a large truck as illustrated in the FIG. 3. Therefore, the vehicle wrongly contributes to generation of a negative observation.

With the use of hysteresis, the number of state changes in a road sign may be reduced. Therefore, the fluctuations may be reduced with the use of the hysteresis as compared to no hysteresis. It may be noted that the upper threshold values and the lower threshold values used in the hysteresis may be chosen differently depending on the roads on which the vehicles travel where the density of vehicles may be different. Using experimental validations for the upper threshold values and the lower threshold values, the hysteresis thresholds may be optimized.

FIG. 4C exemplarily illustrates tabular representation 400C to show update of road sign in map data by systems and methods that determine a sign confidence ratio based on first sensor data. FIG. 4C also shows how road sign is updated in map data by systems and methods that determine sign confidence ratio based on the first sensor data and the second sensor data, when the number of road sign observations is low, in accordance with an example embodiment. FIG. 4C is described in conjunction with the elements from FIG. 1 to FIG. 4B.

The tabular representation 400C shows one or more first positive observations of a road sign (also referred as positive) and one or more first negative observations of the road sign (also referred as negative) obtained as the first sensor data by the system for 7 consecutive days, that is, from day 1 to day 7.

For systems and methods that determine a sign confidence ratio based on the first sensor data, when the number of road sign observations is low, the road sign may be learned immediately on day 1. In other words, when the sign confidence ratio (based on the first sensor data) supersedes a threshold value, the road sign may be learned on day 1. Similarly, for day 2 to day 5, the sign confidence ratio (based on the first sensor data) supersedes a threshold value, and hence, the road sign may be learned for the day 2 to the day 5. However, when the road confidence ratio (based on the first sensor data) drops below the threshold value on day 6, the road sign may be unlearned on the day 6 to update the map data in the map database. Since the number of observations of the road sign on the day 6, (that is, 0 positive and 2 negative) is small as compared to a predetermined threshold value, there may be a possibility that unlearning of the road sign on the day 6 may be inaccurate. The small numbers of road sign observations may affect accuracy of the map data in the map database. In such scenarios, the map data related to the road sign on the day 6 may be unreliable. Further, on day 7, the road sign may be learned again based on the sign confidence ratio that depends on the first sensor data.

For example, the data from user cars on the day 6 and the day 7 may result in oscillation of the road sign. Oscillation of the road sign may correspond to a situation where the road sign may be learned as existing, after a short while the same road sign may be learned as not existing, and again learned as existing and vice versa. In this exemplary scenario, one road sign may be affected because of oscillation in data calculated from the sign confidence ratio based on the first sensor data. However, in certain scenarios, a large number of road signs may be affected because of oscillations in the road signs. Furthermore, such oscillations may increase the processing burden at the map database.

There is further shown a column in tabular representation 400C with updating of map data of the road sign based on a sign confidence ratio that depends on the first sensor data and second sensor data which is fused with a seven day history of road sign observations. The second sensor data may include cumulative historic road sign observation data for time duration. In this exemplary scenario, the time duration is 7 days.

The sign confidence ratio (based on the first sensor data and second sensor data) may be determined as:

$$SCR = ((N_{pos} + N_{pos\ cumulative})/(N_{pos} + N_{pos\ cumulative} + N_{neg} + N_{neg\ cumulative})),$$

wherein SCR indicates the sign confidence ratio, wherein $N_{pos}$ indicates a count of the one or more first positive observations, wherein $N_{pos\ cumulative}$ indicates a count of the one or more second positive observations, wherein $N_{neg}$ indicates a count of the one or more first negative observations, and wherein $N_{neg\ cumulative}$ indicates a count of the one or more second negative observations.

With reference to the tabular representation 400C, the road sign does not oscillate or fluctuate on day 6 when the data is determined based on the sign confidence ratio that takes into account cumulative historic road sign observation data of 7 days.

For systems and methods that determine sign confidence ratio based on the first sensor data and second sensor data, when the number of road sign observations are low, the road sign may be learned (i.e. added to the map data) on the day 2, but not oscillating on days 2 to 7. The reason why it is learned just on the second day is because on day 1, there may be no history. There is no fluctuation in the road sign once it is learned.

The methods and the systems with computed road confidence ratio based on the first sensor data and the second sensor data, as disclosed herein, may have the advantage of providing daily map updates for the road signs. Further the methods and the systems provide highly accurate index of reality with accurate map data for implementing robust driving decisions in vehicles even when the number of road sign observations is small.

FIG. 4D exemplarily illustrates a tabular representation 400D to show road signs with multiple state switches with systems and methods to determine a sign confidence ratio based on first sensor data and also show how road signs are learned in systems and methods to determine sign confidence ratio based on the first sensor data and second sensor data when the number of road sign observations are low, in accordance with an embodiment.

For ten road signs which are represented by their sign ID in the FIG. 4D, 38 sign state switches may be reported when the first sensor data is used to determine the sign confidence ratio for updating map data. However, the sign state switches drastically reduce to 16 as compared to 38 when the first sensor data and second sensor data is used to determine the sign confidence ratio for updating map data.

For example, for sign S1, in the tabular representation, the road sign switches state 5 times (i.e. oscillated) when the road sign is updated in map data using the sign confidence ratio based on the first sensor data. However, for the same sign S1, there was only 1 switch when the road sign is updated in map data using the sign confidence ratio based on the first sensor data and the second sensor data. Therefore, the sign state switches reduced to 16 as compared to 38 substantially eliminates the "oscillation".

FIG. 5 exemplarily illustrates a flowchart for implementation of an exemplary method 500 for updating map data in a map database to indicate presence of a road sign, in accordance with an example embodiment. It will be understood that each block of the flowchart of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 204 of the mapping platform 102, employing an embodiment of the present disclosure and executed by the processor 202 of the mapping platform. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flowchart 500 support combinations of means for performing the specified functions and combinations of operations for performing the specified functions for performing the specified functions. It will also be understood that one or more blocks of the flowchart 500, and combinations of blocks in the flowchart 500, may be implemented by special purpose hardware-based computer systems which perform the specified functions, or combinations of special purpose hardware and computer instructions.

The method illustrated by the flowchart 500 of FIG. 5 for updating map data of the map database to indicate the presence of a road sign includes, at 504, obtaining first sensor data associated with the road sign. The first sensor data associated with the road sign may be received from at least one vehicle, by the mapping platform 102. In some example embodiments, such first sensor data may be obtained from thousands of customer vehicles within certain time duration, such as 24 hours or 48 hours. The first sensor data may comprise at least one of one or more first positive observations of a road sign or one or more first negative observations of the road sign. The positive road sign observation may indicate location and time data for the road sign, while the negative road sign observation may include data indicating absence of the road sign, such as based on vehicles traces.

Once the road sign observation has been received in this way, the method may further include, at 506, obtaining second sensor data for the road sign. In some example embodiments, the second sensor data may be obtained based on the first sensor data. For example, the second sensor data may be obtained when a count of the observations in the first sensor data is less than a threshold value. Alternately, in some example embodiments, the second sensor data may be obtained without regards to the first sensor data. The second sensor data may comprise cumulative historic road sign observation data for time duration. The second sensor data may comprise at least one of one or more second positive observations or one or more second negative observations. The second sensor data associated with the road sign may be received from at least one vehicle, by the mapping platform 102. In some example embodiments, such second sensor data may be obtained from thousands of customer vehicles within certain time duration, such as 72 hours or 96 hours.

The method may further include, at 508, determining a sign confidence ratio based on the first sensor data and the second sensor data. Specifically, the sign confidence ratio may be computed as a $SCR=((N_{pos}+N_{pos\ cumulative})/N_{pos}+N_{pos\ cumulative}+N_{neg}+N_{neg\ cumulative}))$, wherein SCR indicates the sign confidence ratio, wherein $N_{pos}$ indicates a count of the one or more first positive observations, wherein $N_{pos\ cumulative}$ indicates a count of the second positive observations, wherein $N_{neg}$ indicates a count of the first negative observations, and wherein $N_{neg\ cumulative}$ indicates a count of the second negative observations. In some example embodiments, the sign confidence ratio may be based on the first sensor data when the number of observations in the first sensor data is greater than a predetermined value.

Further, the method may include, at 510, updating the map database based on the sign confidence ratio. The update may be performed based on the comparison of the sign confidence ratio with a threshold value. The map data may be updated to indicate absence of the road sign based on the sign confidence ratio being less than a threshold value. The map data may be updated to indicate presence of the road sign, based on the sign confidence ratio being greater than or equal to a threshold value. Further, based on determining the presence or absence of the road sign, the map database may be updated to add or delete the road sign, respectively, to the map database. The control passes to the end at 512.

In an example embodiment, a system (mapping platform) for performing the method 500 of FIG. 5 above may comprise a processor (e.g. the processor 202) configured to perform some or each of the operations (502 to 512) described above. The processor may, for example, be configured to perform the operations (502-512) by performing hardware implemented logical functions, executing stored instructions, or executing algorithms for performing each of the operations. Alternatively, the system may comprise means for performing each of the operations described above. In this regard, according to an example embodiment, examples of means for performing operations 502-512 may comprise, for example, the processor 202 and/or a device or circuit for executing instructions or executing an algorithm for processing information as described above.

On implementing the method disclosed herein, the end result generated by the mapping platform 102 is a tangible determination of the presence of the road sign and corresponding update of the map database accordingly.

Example embodiments disclosed herein provides an improvement in navigation technology related to identification of presence of road signs and real time update of the map data in the map database. The methods and systems disclosed herein use the data provided by customer vehicles, and perform cloud based processing of such data, using the mapping platform to provide most up to date map data indicating the presence of road signs on various links.

The accuracy of the determination of the road sign presence also depends upon choosing an optimal threshold value for sign confidence ratio comparison. The accuracy of the determination of the road sign presence also depends upon choosing the second sensor data that comprises cumulative historic road sign observation data along with the first sensor data to determine the sign confidence ratio. Therefore, by implementing the systems and methods described herein, the accuracy of the determination of the road sign may be increased even when the number of observations is small.

Generally, the method and the system disclosed herein may be used to provide automated road sign addition and removal from the map database based on the sign confidence ratio for each road sign in the map. The method and the system disclosed herein may be used for effectively providing daily updates to the map data using a plurality, such as thousands of customer vehicles.

Many modifications and other embodiments of the inventions set forth herein will come to mind to one skilled in the art to which these inventions pertain having the benefit of the teachings presented in the foregoing descriptions and the associated drawings. The focus is on road signs but the methods and applications discussed herein can also be applied to other road objects. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for updating map data, comprising:
at least one non-transitory memory configured to store computer program code instructions; and
at least one processor configured to execute the computer program code instructions to:
 obtain first sensor data associated with a road sign, wherein the first sensor data comprises at least one of one or more first positive observations of the road sign or one or more first negative observations of the road sign;
 obtain second sensor data for the road sign, based on the first sensor data, wherein the second sensor data comprise cumulative historic road sign observation data for a pre-defined time duration, and at least one of one or more second positive observations or one or more second negative observations;
 determine a sign confidence ratio (SCR) based on the first sensor data and the second sensor data, the SCR determined as:

$SCR=((N_{pos}+N_{pos\ cumulative})/(N_{pos}+N_{pos\ cumulative}+N_{neg}+N_{neg\ cumulative}))$, wherein $N_{pos}$ indicates a count of the one or more first positive observations,
 wherein $N_{pos\ cumulative}$ indicates a count of the one or more second positive observations,
 wherein $N_{neg}$ indicates a count of the one or more first negative observations, and
 wherein $N_{neg\ cumulative}$ indicates a count of the one or more second negative observations; and update the map data based on the sign confidence ratio to indicate a presence of the road sign or an absence of the road sign when the sign confidence ratio satisfies a pre-determined threshold value.

2. The system of claim 1, further comprising:
determine the sign confidence ratio does not satisfy the pre-determined threshold value; and
delete the road sign from the map database based on the determination.

3. The system of claim 1, further comprising:
determine the sign confidence ratio satisfies the pre-determined threshold value;
check the road sign for oscillation based on previous state of the road sign to determine that a road sign observation satisfies the pre-determined threshold value; and
add the road sign to the map database.

4. The system of claim 1, wherein the one or more first positive observations indicate that one or more sensors associated with a vehicle have detected the road sign at a specific location and at a specific time.

5. The system of claim 1, wherein the one or more first negative observations indicate that one or more sensors associated with a vehicle did not detect the road sign at an expected location, and wherein the one or more sensors associated with the vehicle did not detect the road sign due to weather conditions, obstruction of the road sign, or a combination thereof.

6. The system of claim 1, wherein the sign confidence ratio is based on the first sensor data when the one or more first positive observations of the road sign or the one or more first negative observations of the road sign is above the pre-determined threshold value.

7. The system of claim 1, wherein the second sensor data is obtained when a count of the observations in the first sensor data is less than the pre-determined threshold value.

8. A method for updating map data, comprising:
obtaining first sensor data associated with a road sign, wherein the first sensor data comprises at least one of one or more first positive observations of the road sign or one or more first negative observations of the road sign;
obtaining second sensor data for the road sign, wherein the second sensor data comprises cumulative historic road sign observation data for a pre-defined time duration, and at least one of one or more second positive observations or one or more second negative observations;
determining, by one or more processors, a sign confidence ratio (SCR) based on the first sensor data and the second sensor data, the SCR determined as:

$$SCR=((N_{pos}+N_{pos\ cumulative})/(N_{pos}+N_{pos\ cumulative}+N_{neg}+N_{neg\ cumulative})),$$

wherein $N_{pos}$ indicates a count of the one or more first positive observations,
wherein $N_{pos\ cumulative}$ indicates a count of the one or more second positive observations,
wherein $N_{neg}$ indicates a count of the one or more first negative observations, and
wherein $N_{neg\ cumulative}$ indicates a count of the one or more second negative observations; and
updating the map data based on the sign confidence ratio to indicate a presence of the road sign or an absence of the road sign when the sign confidence ratio satisfies a pre-determined threshold value.

9. The method of claim 8, further comprising:
determining the sign confidence ratio does not satisfy the pre-determined threshold value; and
deleting the road sign from the map database based on the determination.

10. The method of claim 8, further comprising:
determining the sign confidence ratio satisfies the pre-determined threshold value;
checking the road sign for oscillation based on previous state of the road sign to determine that a road sign observation satisfies the pre-determined threshold value; and
adding the road sign to the map database.

11. The method of claim 8, wherein the one or more first positive observations indicate that one or more sensors associated with a vehicle have detected the road sign at a specific location and at a specific time.

12. The method of claim 8, wherein the one or more first negative observations indicate that one or more sensors associated with a vehicle did not detect the road sign at an expected location, and wherein the one or more sensors associated with the vehicle did not detect the road sign due to weather conditions, obstruction of the road sign, or a combination thereof.

13. The method of claim 8, wherein the sign confidence ratio is based on the first sensor data when the one or more first positive observations of the road sign or the one or more first negative observations of the road sign is above the pre-determined threshold value.

14. The method of claim 8, wherein the second sensor data is obtained when a count of the observations in the first sensor data is less than the pre-determined threshold value.

15. A computer programmable product comprising a non-transitory computer readable medium having stored thereon computer executable instructions, which when executed by one or more processors, cause the one or more processors to carry out operations for updating map data, the operations comprising:
obtaining first sensor data associated with a road sign, wherein the first sensor data comprises at least one of one or more first positive observations of the road sign or one or more first negative observations of the road sign;
obtaining second sensor data for the road sign, based on a count of the at least one of the one or more first positive observations or the one or more first negative observations is less than a pre-determined threshold value, wherein the second sensor data comprise cumulative historic road sign observation data for a pre-defined time duration, and at least one of one or more second positive observations or one or more second negative observations;
determining a sign confidence ratio SCR) based on the first sensor data and the second sensor data, the SCR determined as:

$$SCR=((N_{pos}+N_{pos\ cumulative})/(N_{pos}+N_{pos\ cumulative}+N_{neg}+N_{neg\ cumulative})),$$

wherein $N_{pos}$ indicates a count of the one or more first positive observations,
wherein $N_{pos\ cumulative}$ indicates a count of the one or more second positive observations,
wherein $N_{neg}$ indicates a count of the one or more first negative observations, and
wherein $N_{neg\ cumulative}$ indicates a count of the one or more second negative observations; and updating the map data based on the sign confidence ratio to indicate a presence of the road sign or an absence of the road sign when the sign confidence ratio satisfies a pre-determined threshold value.

16. The computer program product of claim 15, further comprising:
   determining the sign confidence ratio does not satisfy the pre-determined threshold value; and
   deleting the road sign from the map database based on the determination.

17. The computer program product of claim 15, further comprising:
   determining the sign confidence ratio satisfies the pre-determined threshold value;
   checking the road sign for oscillation based on previous state of the road sign to determine that a road sign observation satisfies the pre-determined threshold value; and
   adding the road sign to the map database.

* * * * *